Oct. 11, 1927. Re. 16,771

G. KRELL

CASING ELEVATOR

Original Filed June 9, 1923

INVENTOR
George Krell.
BY
Wm C Brown
ATTORNEY

Reissued Oct. 11, 1927.

Re. 16,771

UNITED STATES PATENT OFFICE.

GEORGE KRELL, OF SAPULPA, OKLAHOMA.

CASING ELEVATOR.

Original No. 1,504,355, dated August 12, 1924, Serial No. 644,338, filed June 9, 1923. Application for reissue filed August 25, 1927. Serial No. 215,492.

This invention relates to casing elevators for wells, and the primary object of the invention is to provide an efficient form of casing elevator, in which self-seating jaws are provided for gripping the well casing. In my former Patent, No. 1,446,568, granted February 27, 1923, I have disclosed a similar construction of casing elevator, in which the co-operating casing engaging jaws each consists of a single piece of metal, having half round casing engaging portions. The elevator disclosed in that patent has proven to have a very high degree of efficiency, but in order to manufacture it, it is necessary to machine the half round portions carefully, a process which on account of the shape is more than an ordinary machine operation. The present invention contemplates an elevator having jaws which will not require the fine, careful work involved in manufacture of the elevator shown in my former patent. To this end, I have re-arranged the parts somewhat and have constructed each jaw of two members which are hinged together so that there will be a light play between the complementary members of each jaw, enabling the jaws to seat upon the casing evenly though they are not thoroughly machined.

The novelty will be apparent by reference to the following description in connection with the accompanying drawings, in which.

Figure 4:
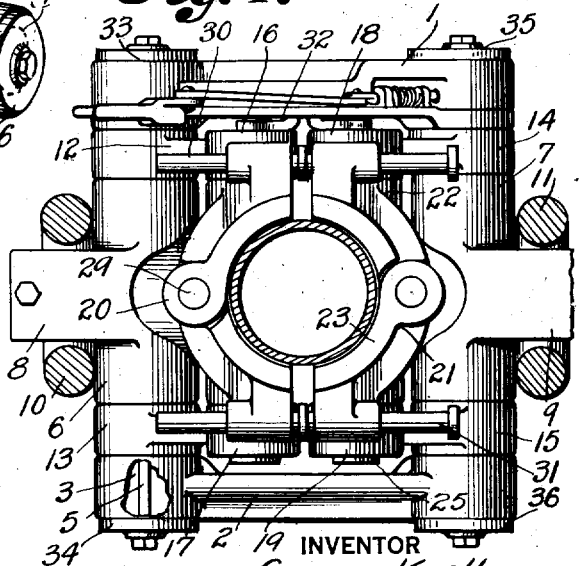
Fig. 4 is a top plan view of the elevator, the support links being shown in section.
Figure 5:
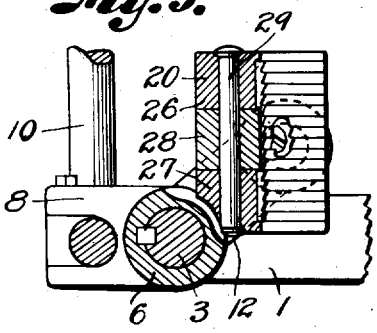
Fig. 5 is a vertical sectional view of one of the jaw members showing its relation to one of its supporting rocker arms.

As shown in my prior patent, the elevator frame consists of two side bars, 1 and 2, and two end members 3 and 4, which are shown as shafts. The end members are keyed to the ends of the side members by keys 5 (see Fig. 4); in the metal portions of the end members 3 and 4 are sleeves 6 and 7. These are also keyed to shafts 3 and 4. The sleeves have outstanding lugs 8 and 9, to which elevator supported links 10 and 11 are secured. The links 10 and 11 are loose in the lugs 8 and 9 to allow flexibility with respect to the frame, so that when the casing is being drawn or lowered into the well, provision may be made for slight mis-alignment between the cable blocks and the center of the tubing.

Between the sleeves 6 and 7 and the ends of the side bars 1 and 2 are inwardly and upwardly disposed rocking levers or arms 12, 13, 14 and 15, having rigid collars or sockets 16, 17, 18 and 19, in which are mounted the trunnions of the respective jaws 20 and 21.

Figure 1:
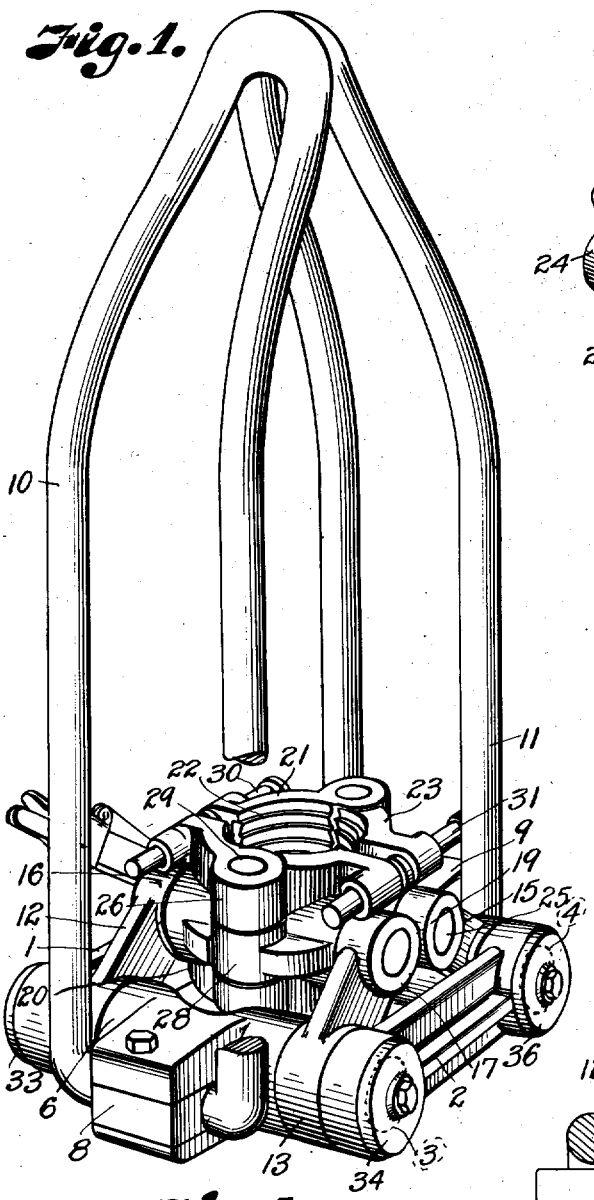
Fig. 1 is a perspective view of a casing elevator, constructed in accordance with my invention.
Figure 2:
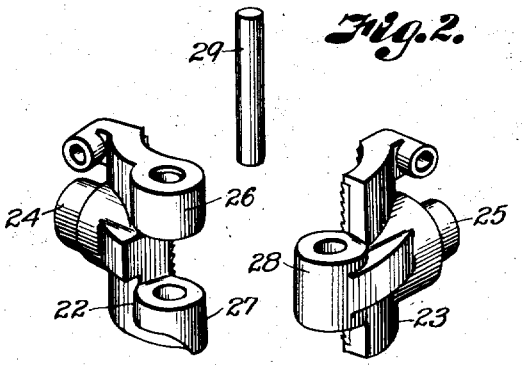
Fig. 2 is a disassociated view of two members of one jaw and the pin for connecting them.
Figure 3:
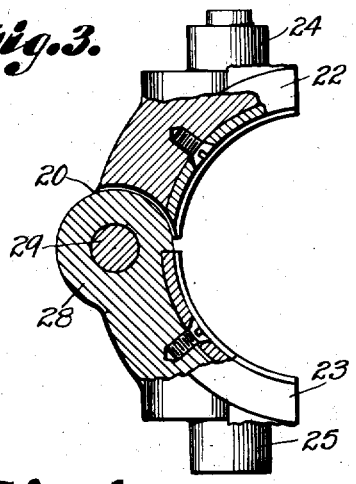
Fig. 3 is a view, partly in plan and partly in section of one of the jaws.

The complementary jaws are constructed alike; therefore, I have shown one jaw construction in detail in Figs. 2 and 3. Each jaw consists of two segmental members 22 and 23, having trunnions 24 and 25 respectively, which are received in the collars 16, 17, 18 and 19. The two members of each jaw are hinged together; one member, for example 22, is provided with two spaced, perforate lugs 26 and 27. The other member, for example 23, is provided with one perforate lug 28, which is received between the two lugs 26 and 27, the lugs being secured by a pin or pintle 29, which passes through them to form a hinge. Therefore, the two members 22 and 23 of each jaw are flexibly connected so that when they are moved into casing-engaging position, there will be four jaw members, each finding its own seat, as distinguished from two jaw members, shown in my prior patent.

In order to allow the necessary play for the jaw members, the trunnions 24 and 25 do not fit tightly into the collars, it being obvious that in order to permit the jaw members to seat evenly all around the casing, only a very slight play is necessary.

The jaw members are held in normal parallelism by the transverse pins 30 and 31, in substantially the same way as shown in my former patent, and so in this application, I do not lay any special stress on the form of the mechanism, aside from the jaws, and in this construction as well as in the construction shown in my former patent, jaw opening linkage 32 may be provided. The side bars 1 and 2 are held on the shaft by the end plates 33, 34, 35 and 36.

What I claim and desire to secure by Letters Patent is:

1. In a casing elevator, a frame, rock shafts, rocker arms carried by the shafts, and casing-engaging jaws carried by the rocker arms, each jaw consisting of two members having a hinged connection.

2. In a casing elevator, a frame, inwardly and upwardly projecting rocker arms carried by the frame, and casing-engaging jaws trunnioned on the rocker arms, each jaw comprising two segmental members, and means for hinging the two members together.

3. In a casing elevator, a frame, rocker arms carried by the frame, and segmental jaw members hinged together in pairs and supported by the rocker arms.

In testimony whereof I affix my signature.

GEORGE KRELL.